United States Patent
Xia (10) Patent No.: US 11,002,371 B2
(45) Date of Patent: May 11, 2021

(54) FLOW CONTROL SWITCH VALVE

(71) Applicant: Beijing Kohler Ltd., Beijing (CN)

(72) Inventor: Pengcheng Xia, Beijing (CN)

(73) Assignee: BEIJING KOHLER LTD., Beijing (CN)

( * ) Notice: Subject to any disclaimer, the term of this patent is extended or adjusted under 35 U.S.C. 154(b) by 33 days.

(21) Appl. No.: 16/452,774

(22) Filed: Jun. 26, 2019

(65) Prior Publication Data

US 2020/0003312 A1    Jan. 2, 2020

(30) Foreign Application Priority Data

Jun. 27, 2018    (CN) .......................... 201821004489.X (51) Int. Cl.
*F16K 7/04*    (2006.01)
*F16K 1/48*    (2006.01)
(Continued)

(52) U.S. Cl.
CPC .............. *F16K 7/045* (2013.01); *F16K 1/482* (2013.01); *F16K 3/246* (2013.01); *F16K 17/105* (2013.01); *F16K 21/06* (2013.01); *F16K 27/0236* (2013.01); *F16K 31/145* (2013.01); *F16K 31/365* (2013.01); *F16K 31/404* (2013.01);
(Continued)

(58) Field of Classification Search
CPC ......... Y10T 137/7765; Y10T 137/7768; F16K 17/105; F16K 39/024; F16K 31/3855; F16K 31/365; F16K 7/045; F16K 1/523; F16K 31/086; F16K 21/06; F16K 31/145; F16K 31/52491; F16K 27/0236; F16K 31/404
See application file for complete search history.

(56) References Cited

U.S. PATENT DOCUMENTS 7,296,593 B2 * 11/2007 Matsui ...................... E03C 1/04
                                                     137/597
10,232,386 B1 * 3/2019 Lu .......................... F16K 31/086
(Continued)

FOREIGN PATENT DOCUMENTS

BE          811563        8/1974
CN        106641277       5/2017
(Continued)

OTHER PUBLICATIONS

EP Search Report regarding Application No. 19182869.8 dated Nov. 11, 2019.
(Continued)

*Primary Examiner* — Atif H Chaudry
(74) *Attorney, Agent, or Firm* — Foley & Lardner LLP (57) ABSTRACT

A flow regulating switch valve includes a valve core that includes a switch assembly configured to drive a diaphragm assembly to open or close a water outlet, and also includes a flow regulating assembly that comprises a rotating ring, a sliding block, and a magnet. A control key is configured to control the switch assembly. The rotating ring is connected to the control key and includes an inclined plane that transitions from high to low and is configured to drive the sliding block to slide up and down such that the sliding block drives the magnet to move up and down. The magnet is configured to control the diaphragm assembly to regulate a size of the water outlet.

20 Claims, 8 Drawing Sheets

(51) Int. Cl.
*F16K 3/24* (2006.01)
*F16K 31/145* (2006.01)
*F16K 31/40* (2006.01)
*F16K 31/365* (2006.01)
*F16K 17/10* (2006.01)
*F16K 39/02* (2006.01)
*F16K 21/06* (2006.01)
*F16K 27/02* (2006.01)

(52) U.S. Cl.
CPC ....... *F16K 39/024* (2013.01); *Y10T 137/7765* (2015.04); *Y10T 137/7768* (2015.04)

(56) References Cited

U.S. PATENT DOCUMENTS

2015/0115183 A1* 4/2015 Nobili ............... F16K 31/52408
 251/65
2018/0031141 A1* 2/2018 Ye ......................... F16K 31/145
2019/0120403 A1* 4/2019 Gao .................... F16K 31/3855
2019/0383402 A1* 12/2019 Tempel ............. F16K 31/52408

FOREIGN PATENT DOCUMENTS

| EP | 2 865 928 | 4/2015 |
| EP | 2 868 953 | 5/2015 |

OTHER PUBLICATIONS

EP Search Report for EP 19182869.8 dated Nov. 11, 2019.
EP Search Report for EP 19182869.8 dated Jul. 9, 2020.

* cited by examiner

FLOW CONTROL SWITCH VALVE

CROSS-REFERENCE TO RELATED PATENT APPLICATIONS

This application claims priority to and the benefit of Chinese Utility Model No. 201821004489.X, filed Jun. 27, 2018, the entire disclosure of which, including the specification, drawings, claims and abstract, is incorporated herein by reference in its entirety.

FIELD

The present application relates to the field of bathroom plumbing technologies, and more particularly, to a flow regulating switch valve for use in faucets and the like.

BACKGROUND

In the sanitary industry, existing faucets mostly use ordinary valve cores, and the flow of water increases with the increase of a water pressure. A water discharge amount is regulated by an opening angle of the handle, or the flow is restricted using a flow restrictor. An improper opening position of the handle may result in wasting of water, and the flow restrictor may be easily blocked and can be inconvenient to use.

It would thus be advantageous to provide a faucet that includes a mechanism that can not only control the opening and closing of the valve, but which can also regulate the flow of water from the valve. These and other advantageous features will become apparent to those reviewing the present disclosure.

SUMMARY

An exemplary embodiment relates to a flow regulating switch valve that includes a control key and a valve core comprising a switch assembly and a diaphragm assembly. The control key is configured to press and control the switch assembly, and the switch assembly is configured to drive the diaphragm assembly to open or close a water outlet. The valve core further comprises a flow regulating assembly that comprises a rotating ring, a sliding block, and a magnet. The rotating ring is connected with the control key in a synchronous rotation manner. The rotating ring comprises an inclined plane that transitions from high to low and is configured to drive the sliding block to slide up and down when rotating such that the sliding block drives the magnet to move up and down. The magnet is configured to control the diaphragm assembly to regulate a size of the water outlet.

Another exemplary embodiment relates to a flow regulating switch valve that includes a valve core that includes a switch assembly configured to drive a diaphragm assembly to open or close a water outlet, and also includes a flow regulating assembly that comprises a rotating ring, a sliding block, and a magnet. A control key is configured to control the switch assembly. The rotating ring is connected to the control key and includes an inclined plane that transitions from high to low and is configured to drive the sliding block to slide up and down such that the sliding block drives the magnet to move up and down. The magnet is configured to control the diaphragm assembly to regulate a size of the water outlet.

BRIEF DESCRIPTION OF THE DRAWINGS

The present disclosure will be understood with reference to the accompanying drawings. It is to be understood that the drawings are for the purpose of illustration only, and are not intended to limit the scope of the present application. In the drawings.

DETAILED DESCRIPTION

The present application aims to provide a flow regulating switch valve for a faucet, which can not only control the opening and closing of the valve, but can also regulate the flow of water. In this manner, the concepts disclosed herein are intended to overcome certain defects such as those described above in existing systems.

According to an exemplary embodiment described herein, a regulating switch valve includes a control key and a valve core. The valve core includes a switch assembly and a diaphragm assembly. The control key is configured to press and control the switch assembly, and the switch assembly is configured to drive the diaphragm assembly to open or close a water outlet. The valve core further comprises a flow regulating assembly that includes a rotating ring, a sliding block, and a magnet. The rotating ring is connected with the control key in a synchronous rotation manner, and comprises an inclined plane that is gradually transited from high to low. The inclined plane of the rotating ring is configured to drive the sliding block to slide up and down when rotating. The sliding block drives the magnet to move up and down, and the magnet is configured to control the diaphragm assembly to regulate a size of the water outlet. The rotating ring comprises a ring body, and a lower surface of the ring body is provided with the inclined plane. The sliding block is provided with a convex strip extending along a vertical direction, and an upper surface of the convex strip is contacted with the inclined plane.

Further, the valve core further comprises a valve cap and a valve seat. The valve cap is provided with a circular arc-shaped guide table, and the rotating ring is sleeved on an outer surface of the valve cap. The ring body extends downwardly to form a guide bulge, and a lower surface of the guide bulge is contacted with an upper surface of the guide table. The guide bulge slides along the guide table when the rotating ring rotates, and the guide table is configured to limit the rotating ring so that an axial position of the rotating ring is unchanged.

Each of the ends of the guide table extends upwardly to form a limiting bulge, and the limiting bulge is configured to limit the guide bulge to slide in the guide table. Further, the limiting bulge is provided with a sliding groove along a vertical direction. The convex strip of the sliding block passes through the sliding groove. The upper surface of the convex strip is contacted with the inclined plane of the rotating ring, and the convex strip can slide up and down along the sliding groove.

The valve seat is provided with a guide groove, and a lower end of the convex strip is inserted into the guide groove. A compression spring is mounted between a lower surface of the sliding block and the valve seat, and the compression spring is configured to keep the convex strip in contact with the inclined plane.

Further, the control key is cylindrical, and an inner wall surface of the control key is provided with a limiting groove along a vertical direction; and an outer circumference surface of the ring body is further provided with a mounting lug matched with the limiting groove, the mounting lug can slide along the limiting groove in a vertical direction, the limiting groove is configured to limit a circumferential movement of the mounting lug, and the limiting groove drives the mounting lug of the rotating ring to rotate when the control key rotates.

Further, the valve core further comprises a fixing ring and an elastic sheet, and the fixing ring mounts the elastic sheet on the valve core; and an upper surface of the ring body is provided with at least one section of saw teeth, and the saw teeth are contacted with a lower surface of the elastic sheet.

Further, the flow regulating switch valve further comprises a housing and a nut, and the nut tightly locks the valve core into the housing.

According to an exemplary embodiment, the rotating ring is driven to rotate through the control key. When rotating, the rotating ring drives the sliding block to slide up and down, then the sliding block drives the magnet to move up and down, and the magnet is configured to control the diaphragm assembly to regulate the size of the water outlet, thereby regulating an opening size of the water outlet. The opening or closing of the water outlet is controlled by pressing the control key, and then a water discharge amount of the water outlet is regulated by rotating the control key, which not only can control the opening and closing, but also can regulate the flow.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Figure 1:
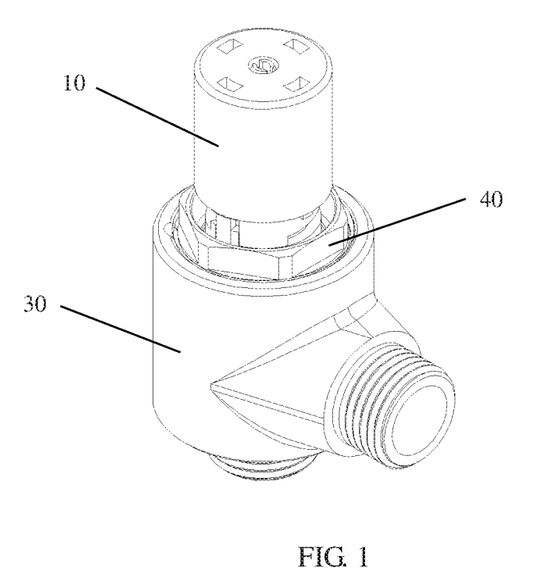
FIG. 1 is a perspective view of a flow regulating switch valve according to an exemplary embodiment.
Figure 2:
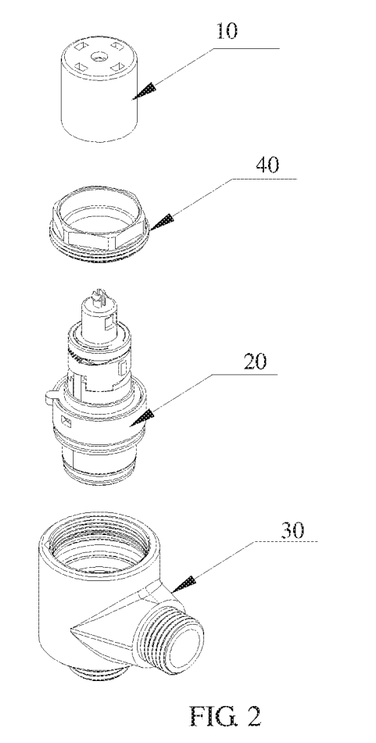
FIG. 2 is an exploded view of the flow regulating switch valve shown in FIG. 1.
Figure 3:
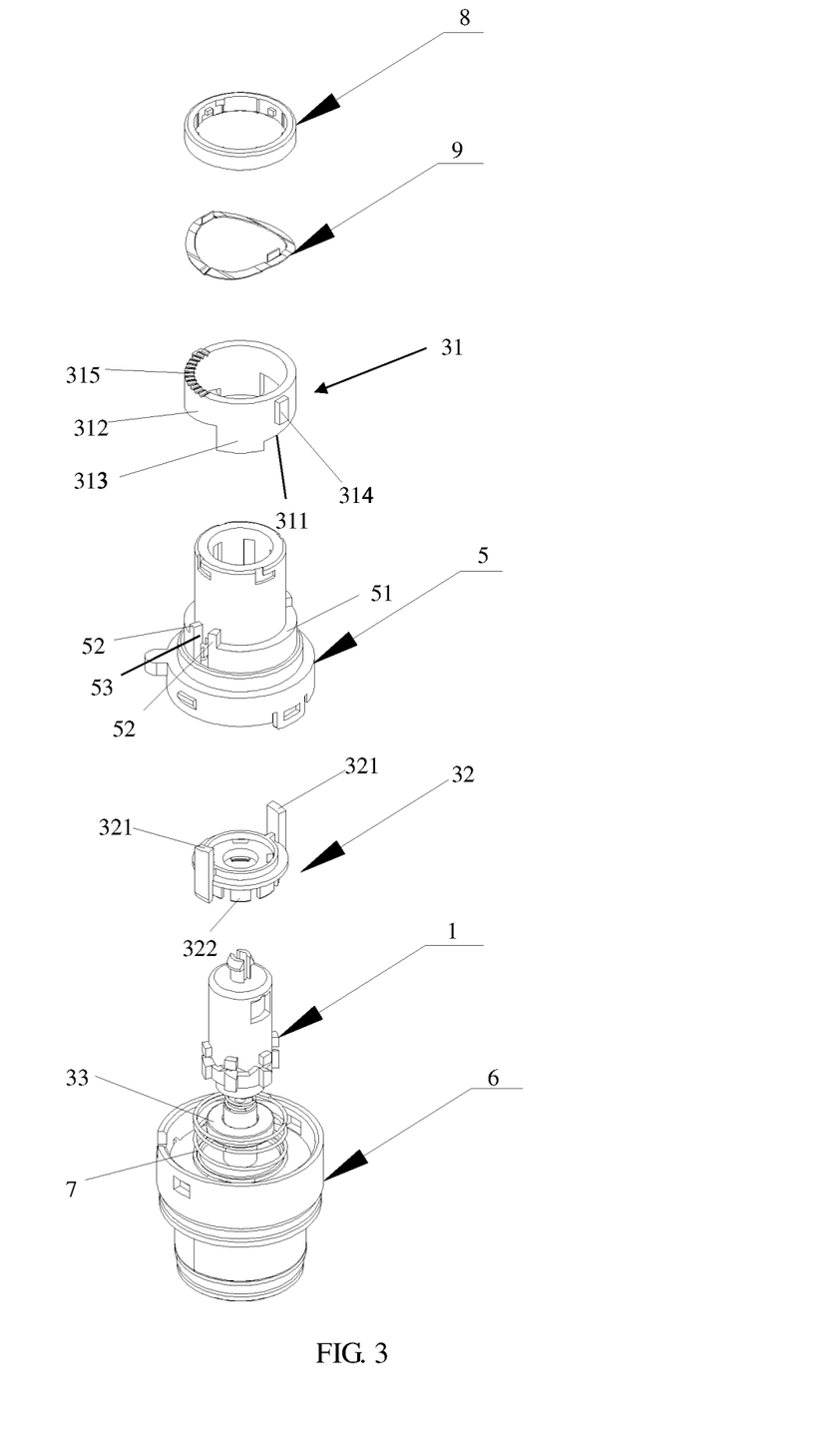
FIG. 3 is an exploded view of a valve core of the flow regulating switch shown in FIG. 1.

As shown in FIGS. 1 to 3, a flow regulating switch valve includes a control key 10 and a valve core 20. The valve core 20 includes a switch assembly 1 and a diaphragm assembly 2. The control key 10 is configured to press and control the switch assembly 1. The switch assembly 1 is configured to drive the diaphragm assembly 2 to open or close a water outlet. The valve core 20 further includes a flow regulating assembly 3, the flow regulating assembly 3 further includes a rotating ring 31, a sliding block 32 and a magnet 33, the rotating ring 31 is connected with the control key 10 in a synchronous rotation manner, the rotating ring 31 includes an inclined plane 311, the inclined plane 311 is gradually transited from high to low, the inclined plane 311 of the rotating ring 31 is configured to drive the sliding block 32 to slide up and down when rotating, the sliding block 32 drives the magnet 33 to move up and down, and the magnet 33 is configured to control the diaphragm assembly 2 to regulate a size of the water outlet 4.

The embodiment includes two control methods.

The first method is to press and control by the control key 10, wherein the switch assembly 1 is controlled by pressing the control key 10. The switch assembly 1 drives the diaphragm assembly 2 to move up and down, and the diaphragm assembly 2 controls the opening or closing of the water outlet 4 (see FIG. 7).

Figure 7:
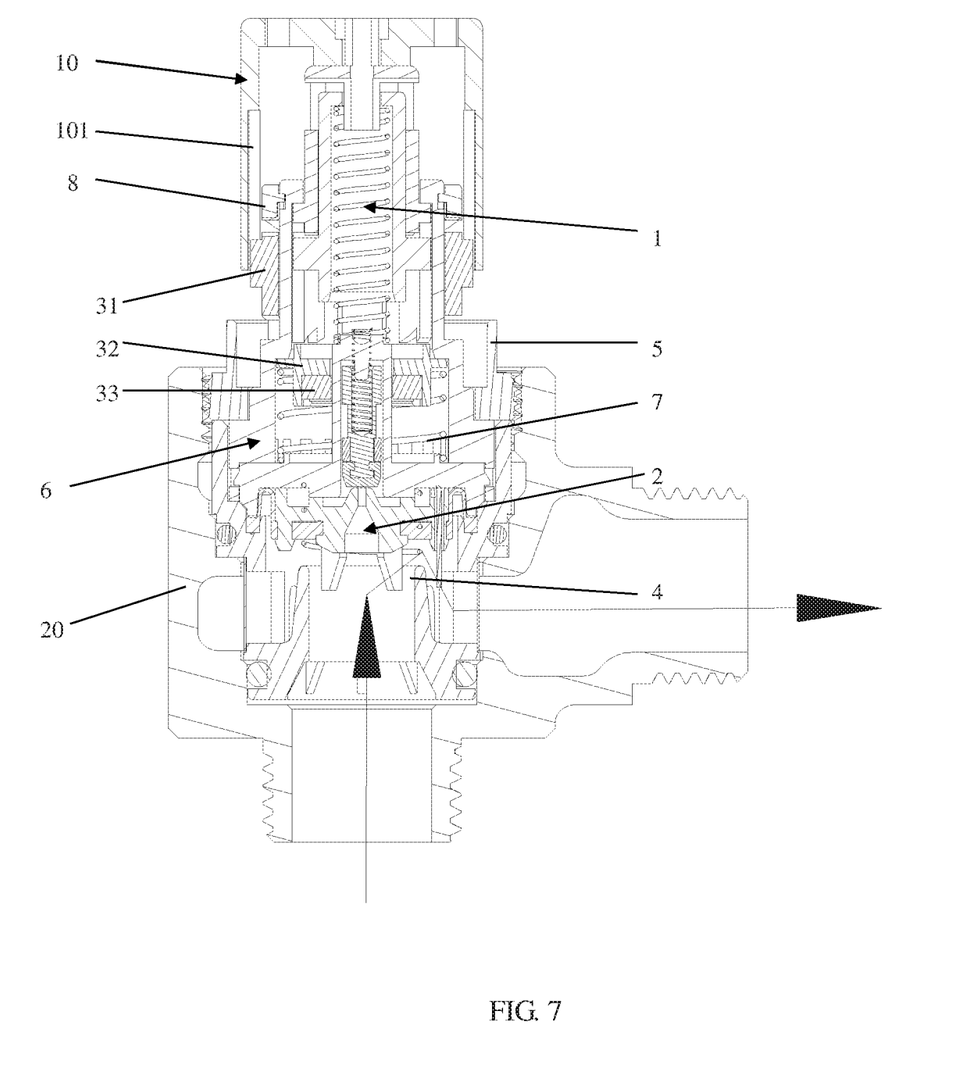
FIG. 7 is a longitudinal sectional view of the valve core of the flow regulating switch valve in another orientation of the maximum flow state according to an exemplary embodiment.

Operation of the switch assembly switch assembly 1 is similar to a pressing switch mode of a ballpoint pen. When pressing the control key 10, the switch assembly 1 is pressed down, and when the diaphragm assembly 2 is pressed down, the water outlet 4 is blocked; when lifting the control key 10, the switch assembly 1 is lifted, and the diaphragm assembly 2 opens the water outlet 4.

A second control method is to rotationally control the control key 10, wherein the rotating ring 31 is driven to rotate by rotating the control key 10, and the inclined plane 311 on the rotating ring 31 is in contact with the sliding block 32. The rotating ring 311 is rotated only in the same axial direction, and pushes the sliding block 32 in the up-down direction due to a change in a contact portion of the inclined plane 311 and the sliding block 32. When the sliding block 32 is in contact with a highest point of the inclined plane 311, the sliding block 32 is at a highest position, the magnet 33 in the sliding block 32 is also at the highest position, the magnet 33 drives the diaphragm assembly 2 to move up, the diaphragm assembly 2 opens the water outlet 4 to the largest at the moment, and the water discharge amount is also the largest. When the sliding block 32 is in contact with a lowest point of the inclined plane 311, the sliding block 32 is at a lowest position, the magnet 33 in the sliding block 32 is also at the lowest position, the magnet 33 drives the diaphragm assembly 2 to move down, the diaphragm assembly 2 opens the water outlet 4 to the smallest at the moment, and the water discharge amount is also the smallest.

The embodiment drives the rotating ring to rotate by the control key; when rotating, the rotating ring drives the sliding block to slide up and down, then the sliding block drives the magnet to move up and down, and the magnet is configured to control the diaphragm assembly to regulate the size of the water outlet, thereby regulating an opening size of the water outlet. The utility model controls the opening or closing of the water outlet by pressing the control key, and then regulates a water discharge amount of the water outlet by rotating the control key, which not only can control the opening and closing, but also can regulate the flow.

Further, as shown in FIG. 3, the rotating ring 31 includes a ring body 312, and a lower surface of the ring body 312 is provided with the inclined plane 311.

The sliding block 32 is provided with a convex strip 321 extending along a vertical direction, and an upper surface of the convex strip 321 is contacted with the inclined plane 311.

Figure 4:
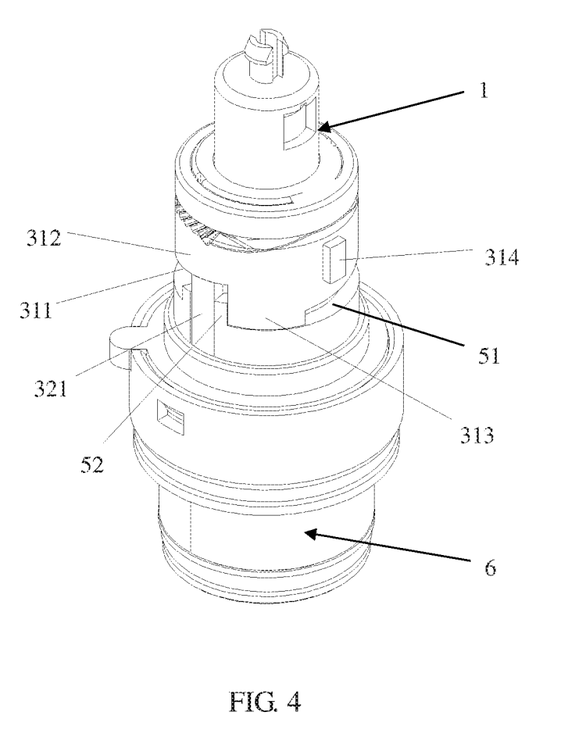
FIG. 4 is a perspective view of the valve core of the flow regulating switch valve in a maximum flow state according to an exemplary embodiment.
Figure 5:
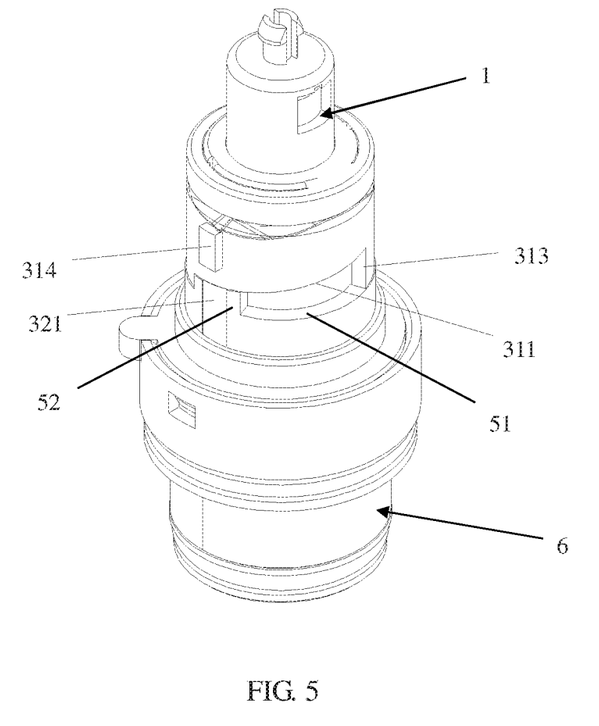
FIG. 5 is a perspective view of the valve core of the flow regulating switch valve in a minimum flow state according to an exemplary embodiment.

As shown in FIG. 4, the upper surface of the convex strip 321 is in contact with the highest point of the inclined plane 311 at the moment. As shown in FIG. 5, the upper surface of the convex strip 321 is in contact with the lowest point of the inclined plane 311 at the moment.

In this embodiment, two convex strips 321 and two inclined planes 311 are provided.

Optionally, only one or other numbers of the convex strips 321 and the inclined planes 311 may be provided.

Further, as shown in FIG. 3, the valve core 20 further includes a fixing ring 8 and an elastic sheet 9, wherein the fixing ring 8 mounts the elastic sheet 9 on the valve core 20.

An upper surface of the ring body 312 is provided with at least one section of saw teeth 315, and the saw teeth 315 are contacted with a lower surface of the elastic sheet 9.

The fixing ring 8 and the elastic sheet 9 are fixed, and when the rotating ring 31 rotates, the saw teeth 315 push the elastic sheet 9 to increase a rotational hand feeling.

Optionally, the fixing ring, the elastic sheet, and the saw teeth may not be provided.

Further, as shown in FIGS. 1 to 2, the flow regulating switch valve further includes a housing 30 and a nut 40, and the nut 40 tightly locks the valve core 20 into the housing 30.

Further, as shown in FIGS. 3 to 5, the valve core 20 further includes a valve cap 5 and a valve seat 6.

The valve cap 5 is provided with a circular arc-shaped guide table 51, the rotating ring 31 is sleeved on an outer surface of the valve cap 5, the ring body 312 downwardly extends out of a guide bulge 313, a lower surface of the guide bulge 313 is contacted with an upper surface of the guide table 51, the guide bulge 313 slides along the guide table 51 when the rotating ring 31 rotates, and the guide table 51 is configured to limit the rotating ring 31 so that an axial position of the rotating ring 31 remains unchanged.

Specifically, the guide table 51 is a plane on a horizontal plane, and the lower surface of the guide bulge 313 is also a plane on the horizontal plane. Since the guide table 51 is fixed to the valve cap 5, a position of the guide table 51 is fixed. When the guide bulge 313 slides along the guide table 51, the axial position of the rotary ring 31 is limited to be unchanged, that is, the rotating ring 31 is rotated only on the same horizontal plane, rather than moving up and down in the axial direction.

Further, as shown in FIGS. 3 to 5, two ends of the guide table 51 upwardly extend to form two limiting bulges 52, and the limiting bulges 52 are configured to limit the guide bulge 313 to slide in the guide table 51.

The two limiting bulges 52 are configured to limit the limiting position of the guide bulge 313 in the clockwise and counterclockwise directions of the guide table 51, so that the guide bulge 313 cannot slide out from the guide table 51, and a maximum rotation angle of the control key 10 is also limited.

Preferably, the maximum rotation angle of the control key 10 is 90 degrees.

Further, as shown in FIGS. 3 to 5, the limiting bulge 52 is provided with a sliding groove 53 along a vertical direction, the convex strip 321 of the sliding block 32 passes through the sliding groove 53, the upper surface of the convex strip 321 is contacted with the inclined plane of the rotating ring 31, and the convex strip 321 can slide up and down along the sliding groove 53.

The sliding groove 53 limits the sliding block 32 to slide only in the up-down direction and cannot be rotated. The sliding block 32 can only be driven to slide up and down by the rotating ring 31.

Figure 6:
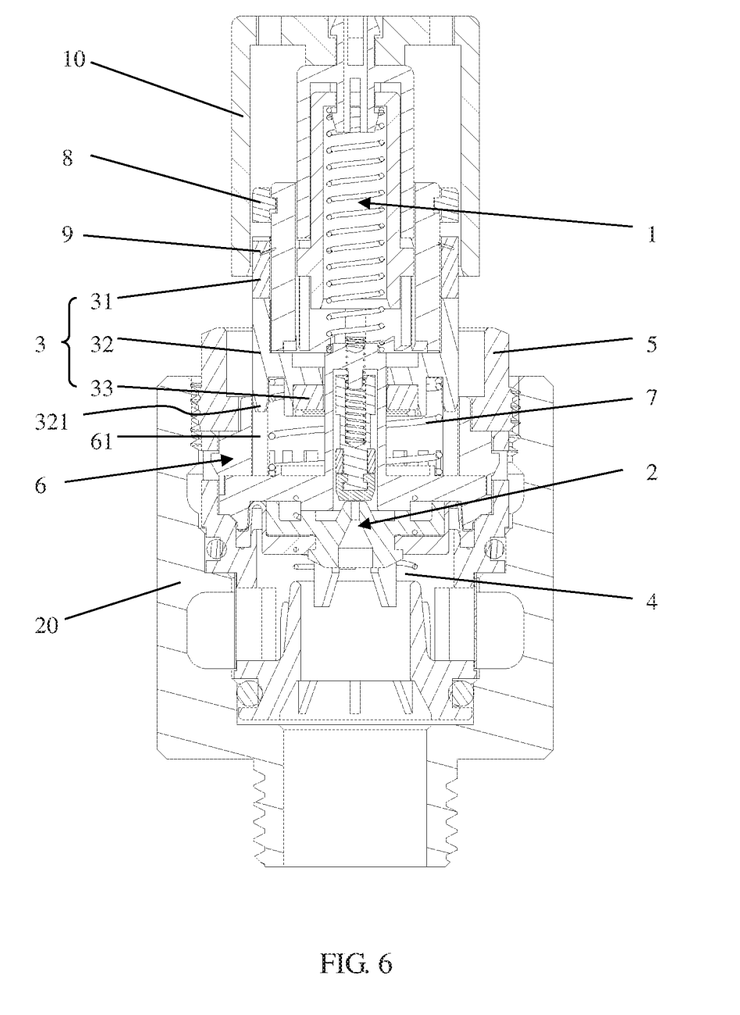
FIG. 6 is a longitudinal sectional view of the valve core of the flow regulating switch valve in one orientation of the maximum flow state according to an exemplary embodiment.

Further, as shown in FIG. 6, the valve seat 6 is provided with a guide groove 61, and a lower end of the convex strip 321 is inserted into the guide groove 61.

The guide groove 61 is configured to position the sliding block 32, the lower end of the convex strip 321 of the sliding block 32 is inserted into the guide groove 61, and the guide groove 61 provides a sufficient space for the up and down movement of the convex strip 321. An upper end of the convex strip 321 passes through the sliding groove 53 of the valve cap 5, and is in contact with the inclined plane 311.

Further, as shown in FIGS. 6 to 7, a compression spring 7 is mounted between a lower surface of the sliding block 32 and the valve seat 6, and the compression spring 7 is configured to keep the convex strip 321 in contact with the inclined plane 311. The compression spring 7 is accommodated in a cavity between the valve seat 6 and the sliding block 32 such that the rotating ring 31 can always drive the sliding block 32 to move up and down.

Further, as shown in FIGS. 4 to 5 and FIGS. 7 to 8, the control key 10 is cylindrical, and an inner wall surface of the control key 10 is provided with a limiting groove 101 along a vertical direction.

An outer circumference surface of the ring body 312 is further provided with a mounting lug 314 matched with the limiting groove 101, the mounting lug 314 can slide along the limiting groove 101 in a vertical direction, the limiting groove 101 is configured to limit a circumferential movement of the mounting lug 314, and the limiting groove 101 drives the mounting lug 314 of the rotating ring 31 to rotate when the control key 10 rotates.

When the control key 10 is pressed, the limiting groove 101 moves up and down, the mounting lug 314 does not move in the limiting groove 101, and a height of the limiting groove 101 is greater than a height of the mounting lug 314.

When the control key 10 rotates, the limiting groove 101 drives the mounting lug 314 to rotate together, thereby controlling the rotating ring 31 to rotate.

As described herein, according to an exemplary embodiment in which the flow regulating operation is operated in a maximum flow state, with reference to in FIG. 4 and FIGS. 6 to 7, when rotating the control key 10 in a forward direction, the control key 10 drives the rotating ring 31 to rotate. When the highest point of the inclined plane 311 of the rotating ring 31 is in contact with the convex strip 321, the sliding block 32 rises to the highest position. At this time, the magnet 33 also rises to the highest position. The magnet 33 drives the diaphragm assembly 2 to also rise to the highest position, and the diaphragm assembly 2 opens the water outlet 4 to the maximum. A direction indicated by an arrow in FIG. 7 is a direction of a water flow.

Figure 8:
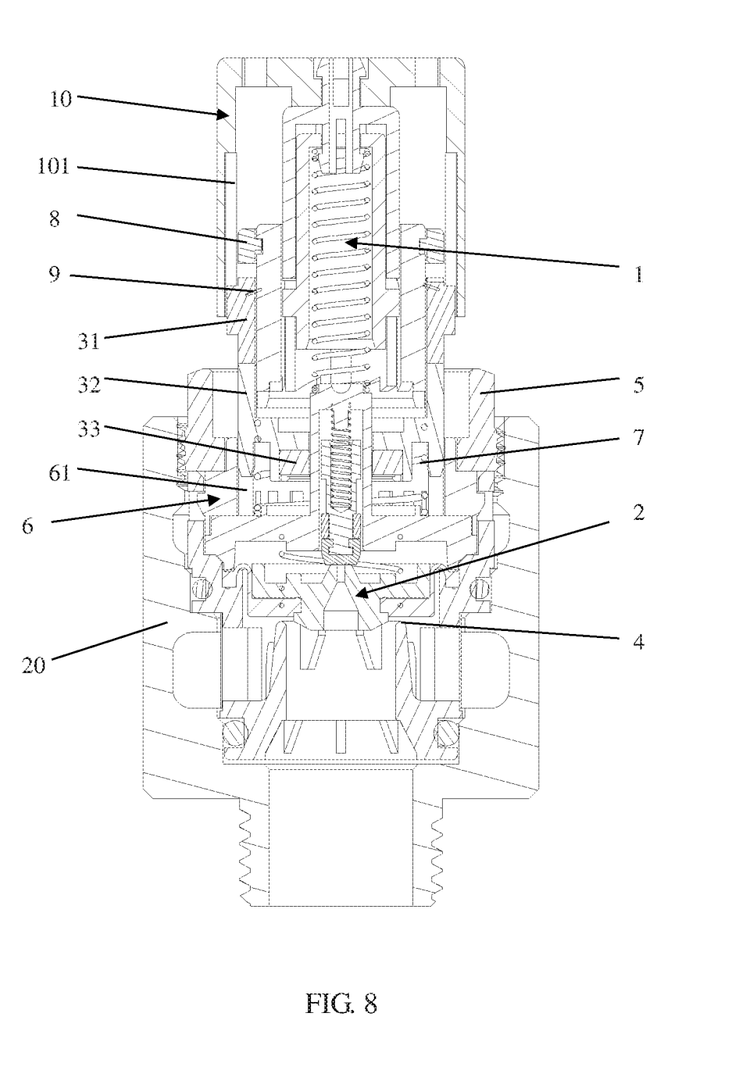
FIG. 8 is a longitudinal sectional view of the valve core of the flow regulating switch valve in one orientation of the minimum flow state according to an exemplary embodiment.
Figure 9:
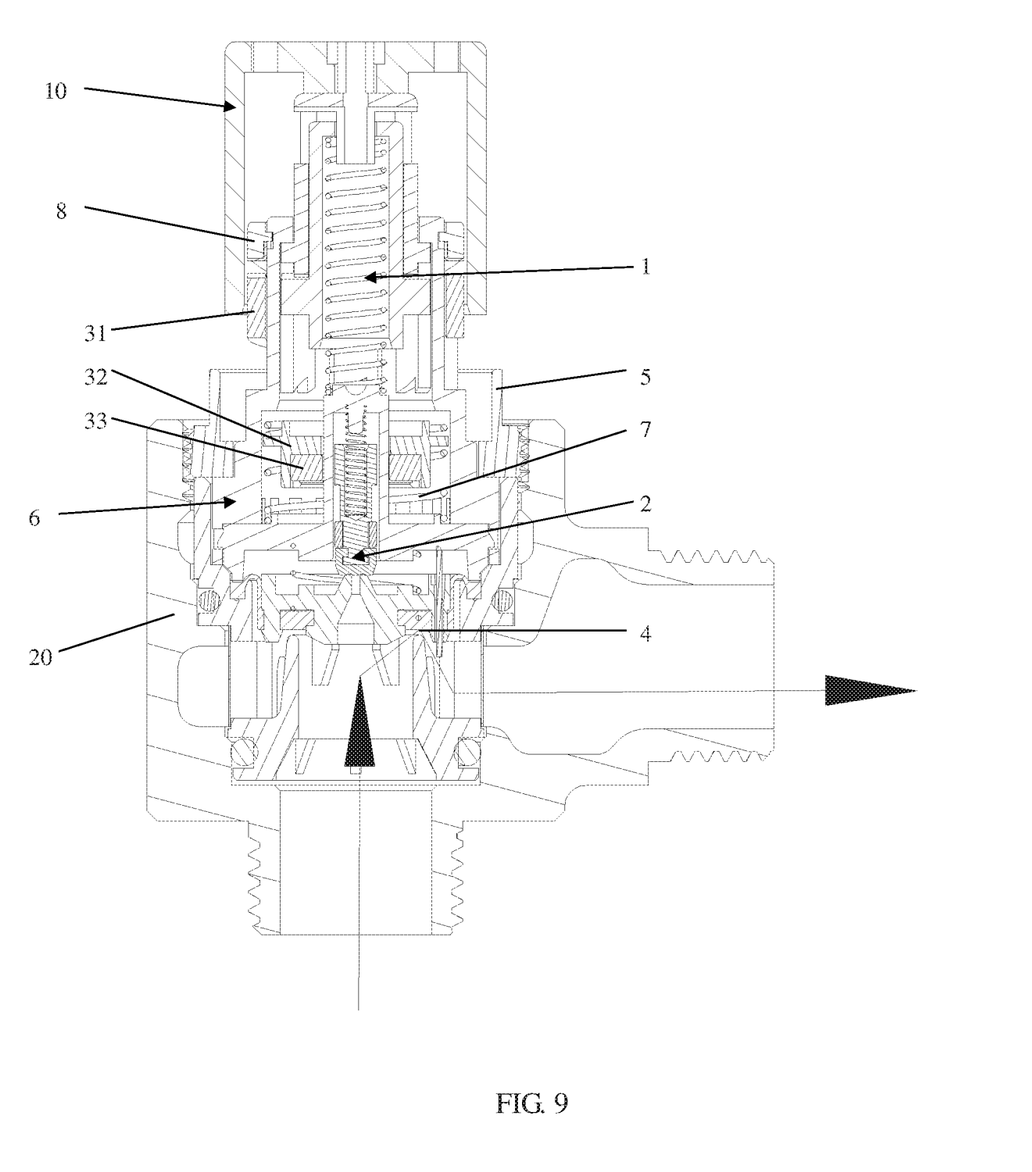
FIG. 9 is a longitudinal sectional view of the valve core of the flow regulating switch valve in another orientation of the minimum flow state according to an exemplary embodiment.

In the minimum flow state, with reference to FIG. 5 and FIGS. 8 to 9, when rotating the control key 10 in the reverse direction, the control key 10 drives the rotating ring 31 to rotate. When the lowest point of the inclined plane 311 of the rotating ring 31 is in contact with the convex strip 321, the sliding block 32 drops to the lowest position. At this time, the magnet 33 also drops to the lowest position. The magnet 33 drives the diaphragm assembly 2 to also drop to the lowest position, and the diaphragm assembly 2 opens the water outlet 4 to the minimum.

When the water outlet 4 needs to be closed, the water outlet 4 can be closed by pressing the control key 10 downward. When the water outlet 4 needs to be opened again, the water outlet 4 can opened by pressing the control key 10 downward, and then the flow is regulated by rotating the control key 10.

The descriptions above are merely principles and exemplary embodiments of the concepts described herein. It should be noted that those of ordinary skill in the art may make a plurality of other modifications based on these principles, and these modifications shall also fall within the scope of the present disclosure.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the components as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A flow regulating switch valve comprising:
   a control key; and
   a valve core comprising a switch assembly and a diaphragm assembly;
   wherein:
      the control key is configured to press and control the switch assembly;
      the switch assembly is configured to drive the diaphragm assembly to open or close a water outlet;
      the valve core further comprises a flow regulating assembly that comprises a rotating ring, a sliding block, and a magnet;
      the rotating ring is connected with the control key in a synchronous rotation manner;
      the rotating ring comprises:
         a ring body;
         an inclined plane on a lower surface of the ring body, wherein the inclined plane transitions from high to low and is configured to drive the sliding block to slide up and down when rotating such that the sliding block drives the magnet to move up and down; and
         at least one section of saw teeth on an upper surface of the ring body; and
      the magnet is configured to control the diaphragm assembly to regulate a size of the water outlet.

2. The flow regulating switch valve according to claim 1, wherein
the sliding block is provided with a convex strip extending along a vertical direction, and an upper surface of the convex strip is in contact with the inclined plane.

3. The flow regulating switch valve according to claim 2, wherein:
   the valve core further comprises a fixing ring and an elastic sheet, and the fixing ring mounts the elastic sheet on the valve core; and
   the at least one section of saw teeth contact a lower surface of the elastic sheet.

4. The flow regulating switch valve according to claim 1, wherein the flow regulating switch valve further comprises a housing and a nut for locking the valve core into the housing.

5. A flow regulating switch valve comprising:
   a control key; and
   a valve core comprising a switch assembly and a diaphragm assembly;
   wherein:
      the control key is configured to press and control the switch assembly;
      the switch assembly is configured to drive the diaphragm assembly to open or close a water outlet;

the valve core further comprises a flow regulating assembly that comprises a rotating ring, a sliding block, and a magnet;
the rotating ring is connected with the control key in a synchronous rotational manner;
the rotating ring comprises an inclined plane that transitions from high to low and is configured to drive the sliding block to slide up and down when rotating such that the sliding block drives the magnet to move up and down;
the magnet is configured to control the diaphragm assembly to regulate a size of the water outlet;
the valve core further comprises a valve cap and a valve seat; and
the valve cap is provided with a circular arc-shaped guide table, the rotating ring is sleeved on an outer surface of the valve cap, a ring body of the rotating ring extends downwardly to form a guide bulge, a lower surface of the guide bulge is in contact with an upper surface of the guide table, the guide bulge slides along the guide table when the rotating ring rotates, and the guide table is configured to limit the rotating ring so that an axial position of the rotating ring is unchanged.

6. The flow regulating switch valve according to claim 5, wherein ends of the guide table extend upwardly to form a limiting bulge, and the limiting bulge is configured to limit the guide bulge to slide in the guide table.

7. The flow regulating switch valve according to claim 6, wherein the sliding block is provided with a convex strip extending along a vertical direction, and an upper surface of the convex strip is in contact with the inclined plane, the limiting bulge is provided with a sliding groove along a vertical direction, the convex strip of the sliding block passes through the sliding groove, the upper surface of the convex strip is in contact with the inclined plane of the rotating ring, and the convex strip can slide up and down along the sliding groove.

8. The flow regulating switch valve according to claim 7, wherein a guide groove is provided in the valve seat, and a lower end of the convex strip is inserted into the guide groove.

9. The flow regulating switch valve according to claim 8, wherein a compression spring is mounted between a lower surface of the sliding block and the valve seat, and the compression spring is configured to keep the convex strip in contact with the inclined plane.

10. A flow regulating switch valve comprising:
a control key; and
a valve core comprising a switch assembly and a diaphragm assembly;
wherein:
the control key is configured to press and control the switch assembly;
the switch assembly is configured to drive the diaphragm assembly to open or close a water outlet;
the valve core further comprises a flow regulating assembly that comprises a rotating ring, a sliding block, and a magnet;
the rotating ring is connected with the control key in a synchronous rotational manner;
the rotating ring comprises an inclined plane that transitions from high to low and is configured to drive the sliding block to slide up and down when rotating such that the sliding block drives the magnet to move up and down;
the magnet is configured to control the diaphragm assembly to regulate a size of the water outlet;
the control key is cylindrical, and an inner wall surface of the control key is provided with a limiting groove along a vertical direction; and
an outer circumference surface of a ring body of the rotating ring is further provided with a mounting lug matched with the limiting groove, the mounting lug can slide along the limiting groove in a vertical direction, the limiting groove is configured to limit a circumferential movement of the mounting lug, and the limiting groove drives the mounting lug of the rotating ring to rotate when the control key rotates.

11. A flow regulating switch valve comprising:
a valve core comprising:
a switch assembly configured to drive a diaphragm assembly to open or close a water outlet; and
a flow regulating assembly that comprises a rotating ring, a sliding block, and a magnet; and
a control key configured to control the switch assembly;
wherein the rotating ring is connected to the control key and comprises:
a ring body;
an inclined plane on a lower surface of the ring body, wherein the inclined plane transitions from high to low and is configured to drive the sliding block to slide up and down such that the sliding block drives the magnet to move up and down; and
at least one section of saw teeth on an upper surface of the ring body; and
wherein the magnet is configured to control the diaphragm assembly to regulate a size of the water outlet.

12. The flow regulating switch valve according to claim 11, wherein
the sliding block is provided with a convex strip extending along a vertical direction, and an upper surface of the convex strip is in contact with the inclined plane.

13. The flow regulating switch valve according to claim 12, wherein:
the valve core further comprises a fixing ring and an elastic sheet, and the fixing ring mounts the elastic sheet on the valve core; and
the at least one section of saw teeth contact a lower surface of the elastic sheet.

14. The flow regulating switch valve according to claim 11, wherein the flow regulating switch valve further comprises a housing and a nut for locking the valve core into the housing.

15. A flow regulating switch valve comprising:
a valve core comprising:
a switch assembly configured to drive a diaphragm assembly to open or close a water; outlet and
a flow regulating assembly that comprises a rotating ring, a sliding block, and a magnet; and
a control key configured to control the switch assembly;
wherein:
the rotating ring is connected to the control key and comprises an inclined plane that transitions from high to low and is configured to drive the sliding block to slide up and down such that the sliding block drives the magnet to move up and down;
the magnet is configured to control the diaphragm assembly to regulate a size of the water outlet;
the valve core further comprises a valve cap and a valve seat; and
the valve cap is provided with a circular arc-shaped guide table, the rotating ring is sleeved on an outer surface of the valve cap, a ring body of the rotating ring extends downwardly to form a guide bulge, a lower surface of the guide bulge is in contact with an upper surface of the guide table, the guide bulge slides along the guide table when the rotating ring rotates, and the guide table is configured to limit the rotating ring so that an axial position of the rotating ring is unchanged.

16. The flow regulating switch valve according to claim 15, wherein ends of the guide table extend upwardly to form a limiting bulge, and the limiting bulge is configured to limit the guide bulge to slide in the guide table.

17. The flow regulating switch valve according to claim 16, wherein the sliding block is provided with a convex strip extending along a vertical direction, and an upper surface of the convex strip is in contact with the inclined plane, the limiting bulge is provided with a sliding groove along a vertical direction, the convex strip of the sliding block passes through the sliding groove, the upper surface of the convex strip is in contact with the inclined plane of the rotating ring, and the convex strip can slide up and down along the sliding groove.

18. The flow regulating switch valve according to claim 17, wherein a guide groove is provided in the valve seat, and a lower end of the convex strip is inserted into the guide groove.

19. The flow regulating switch valve according to claim 18, wherein a compression spring is mounted between a lower surface of the sliding block and the valve seat, and the compression spring is configured to keep the convex strip in contact with the inclined plane.

20. A flow regulating switch valve comprising:
a valve core comprising:
　a switch assembly configured to drive a diaphragm assembly to open or close a water outlet; and
　a flow regulating assembly that comprises a rotating ring, a sliding block, and a magnet; and
a control key configured to control the switch assembly;
wherein:
the rotating ring is connected to the control key and comprises an inclined plane that transitions from high to low and is configured to drive the sliding block to slide up and down such that the sliding block drives the magnet to move up and down;
the magnet is configured to control the diaphragm assembly to regulate a size of the water outlet;
the control key is cylindrical, and an inner wall surface of the control key is provided with a limiting groove along a vertical direction; and
an outer circumference surface of a ring body of the rotating ring is further provided with a mounting lug matched with the limiting groove, the mounting lug can slide along the limiting groove in a vertical direction, the limiting groove is configured to limit a circumferential movement of the mounting lug, and the limiting groove drives the mounting lug of the rotating ring to rotate when the control key rotates.

* * * * *